United States Patent Office 3,183,270
Patented May 11, 1965

3,183,270
PREPARATION OF FORMALDEHYDE
Johannes J. M. Evers, Sittard, and Willem J. van Asselt, Geleen, Netherlands, assignors to Stamicarbon N.V., Heerlen, Netherlands
No Drawing. Filed Mar. 6, 1961, Ser. No. 93,358
Claims priority, application Netherlands, Mar. 7, 1960, 249,163; June 4, 1960, 252,342; Aug. 2, 1960, 254,465; Jan. 25, 1961, 260,480
10 Claims. (Cl. 260—606)

The present invention relates to the preparation of formaldehyde in a highly pure state. More particularly, the invention is concerned with a novel process for preparing formaldehyde by thermal decomposition of one or more compounds which are composed essentially of formaldehyde and water, the resulting formaldehyde being of such a high degree of purity that it is stable and shows no tendency to form undesired polymerization products of low molecular weight.

It is common knowledge that monomeric formaldehyde which is obtained, for example, by thermal depolymerization of either low molecular weight formaldehyde polymers, such as paraformaldehyde and α- or β-polyoxymethylene, or aqueous formaldehyde solutions, shows a strong tendency to form polymerization products of low molecular weight. In many reactions of formaldehyde, this formation of polymerization products of low molecular weight is an undesirable side reaction.

The formation of polymerization products of low molecular weight is particularly undesirable in the preparation of formaldehyde polymers of high molecular weight which are to be processed into plastics. Normally, the monomeric formaldehyde is fed from its preparation of storage vessel through one or more tubes into the polymerization vessel and a considerable amount of the "prepolymer" tends to deposit in a short time in the tubes which join the vessel containing the monomeric formaldehyde and the vessel in which the polymerization into products of high molecular weight is effected. As a result, the tubes become blocked up thus presenting obvious operational difficulties. Furthermore, the amount of this prepolymer is often so large that the yield of polymer of high molecular weight is low compared to the amount of decomposed starting product.

In view of the above difficulties, steps have been taken in the past in an effort to prepare by thermal decomposition, stable formaldehyde, which, by itself, shows little, if any, tendency to form polymerization products of low molecular weight. Thus, it has been proposed to thermally decompose low-molecular-weight formaldehyde polymers which have been intimately mixed with such an amount of phosphorus pentoxide that per mole of water contained in the formaldehyde polymer approximately one mole of $P_2O_5$ is added. It appears that stable formaldehyde can be prepared in this way but the process still has some drawbacks with regard to its technical or commercial applicability, particularly if the stable formaldehyde is used for the manufacture of high-molecular-weight polymers with plastic properties. Firstly, the rate at which the formaldehyde polymer of low molecular weight decomposes is low in this process. Thus, for example, it has been found that upon heating an intimate mixture of paraformaldehyde and phosphorus pentoxide at 70–75° C. (in vacuo), only 10% by weight of the paraformaldehyde decomposes in 16 hours. Secondly, it appears that the yield of high molecular weight formaldehyde polymer that can be prepared from the resulting formaldehyde is low compared to the amount of polymer of low molecular weight. Apparently this is due to the fact that considerable amounts of byproducts are formed from the formaldehyde by the action of phosphorous pentoxide. Thus, mass spectrometrical analysis of a gas obtained according to this prior process shows the presence of large amounts of dimethylether, dimethoxymethane and methylformiate.

As indicated heretofore, the principal object of the present invention is to prepare formaldehyde by the thermal decomposition of one or more compounds which consist essentially of formaldehyde and water, the formaldehyde thus obtained being characterized by a high degree of purity such that it shows little or no tendency to form undesired low molecular weight polymerization products. Another object of the invention is to provide a process of the above type wherein the decomposition is carried out at a desirable rate to give a yield of very pure formaldehyde which is high based on the amount of formaldehyde present in the starting product. A further object is the preparation of formaldehyde by thermal decomposition which can be subsequently converted into high molecular weight formaldehyde polymers with plastic properties, the yield of such polymers being high based on the weight of formaldehyde in the material subjected to thermal decomposition. Other objects will also be apparent from the following detailed description of the invention.

Broadly stated, the objects of the present invention are realized by carrying out the thermal decomposition of the compound comprising formaldehyde and water, or mixtures of such compounds, in the presence of a substance which, under the reaction conditions, has a very low volatility and shows an acid reaction, phosphorous pentoxide being excepted.

A wide variety of substances demonstrating the desired acid reaction and low volatility may be utilized in the present process. The acid reaction is demonstrated by the fact that the substance has a pH of less than 7 at the decomposition temperature. The degree of volatility can be varied somewhat but, normally, it should not exceed 1% of its weight per hour under the conditions which are used. This degree of volatility does not refer to water that may be present as diluent.

Typical of substances showing an acid reaction which may be used herein, singly or in admixture, are: inorganic acids of very low volatility, such as the various phosphoric acids derived from phosphorous pentoxide, dilute orthophosphoric acid, oleum and other sulphurtrioxide hydrates, concentrated and dilute sulphuric acid, arsenic acid, boric acid, molybdic acid, selenic acid, uranic acid, wolframic acid and chlorosulphonic acid, or organic acids, such as oxalic acid, succinic acid, sebacic acid, palmitic acid, stearic acid, trichloro-acetic acid, paratoluene sulphonic acid, terephthalic acid, phthalic anhydride and cyclohexane carbonic acid. Also suitable are acid oxides, such as aluminum, boron, chromium, silicon, and vanadium oxides, and other compounds showing an acid reaction, such as ferric chloride, zinc chloride, monosodium phosphate and acid potassium phosphate.

It is possible according to the invention to effect the thermal decomposition by heating an intimate mixture of the starting product, e.g. paraformaldehyde, with the substance showing an acid reaction without any other materials being present. However, the thermal decomposition is preferably carried out in the presence of an inert vehicle which is liquid under the reaction conditioins. This promotes a more uniform evolution of the desired formaldehyde gas. The vehicle must be inert to the starting material, the monomeric formaldehyde obtained therefrom and the substance showing an acid reaction.

As the vehicle, there may be used a liquid or mixture of liquids having a boiling point which is so high that the vapor tension (partial vapor pressure) thereof is low at the decomposition temperature. By passing the vapor issuing from the decomposition reactor through one or more coolers, or cooling vessels, which are kept at a temperature exceeding the boiling point of formaldehyde, e.g. a temperature of the order of —15 to 20° C., the relatively small amount of vehicle which may tend to go off with the vaporous formaldehyde product can be removed from the vapor and, if desired, may be used again.

It is to be preferred, however, that there be used in the decomposition, a vehicle or vehicle constituent whose boiling point is such that more than half of the issuing vapor mixture consists of vehicle. This vapor mixture may then be passed through one or more coolers, which are kept at a temperature (e.g. —15 to 20° C.) exceeding the boiling point of formaldehyde. Passage through the cooler or coolers is effected in such a way that, at least in the first cooler, the constituents condensed from the vapor mixture are discharged in a downward direction and the remaining vapor is discharged from the top. The condensate consists essentially of vehicle, water and other impurities and may be returned directly into the decomposition reactor, or it may first be subjected to a purification treatment and subsequently re-used.

It is also recommended that the vehicle, or at least a constituent thereof, be one which is capable, at least at the decomposition temperature utilized, of dissolving the substance or mixture of substances showing an acid reaction. A preferred way of doing this is to use as the vehicle or vehicle constituent, a liquid which is a solvent for water, i.e. is miscible therewith, both at the decomposition temperature and at the temperature at which the vapor mixture is cooled. Especially desirable vehicles are those which, when mixed with water, remain liquid at the cooling temperature that it utilized and are poor to moderately poor solvents for formaldehyde, at least at the cooling temperature.

Compounds which are particularly suitable for use herein as the vehicle or as a component therefor, are the ethers, including simple and complex aliphatic ethers, as well as cyclic compounds having ether characteristics. Mixtures of such compounds may also be used. Examples of compounds which may be used as such are: dipropylether, dibutylether, dimethyl-glycolether, diethylglycolether, diethyl-(diethyleneglycol)ether, dimethyl-(tri-ethyleneglycol)ether. Especially desirable for use herein is dioxane.

Other compounds which may be used as the vehicle or as a constituent thereof are, for example, the aliphatic, cyclo-aliphatic and aromatic hydrocarbons or hydrocarbon mixtures, such as heptane, octane, tetrahydronaphthalene, decahydronaphthalene, toluene, xylenes, light and heavy gasoline fractions and kerosene.

The material subjected to decomposition according to the present process may be any product which consists essentially of formaldehyde and water. This includes formaldehyde polymers as well as aqueous formaldehyde solutions. If formaldehyde polymers are used as starting product, the process may be carried out either in the absence or presence of a vehicle. On the other hand, if aqueous formaldehyde solutions are used as starting product, good results are generally obtained only if the process is carried out in the presence of a vehicle and, preferably, according to the above-described process in which, at least in the first cooler, the constituents condensed from the vapor mixture are discharged as a liquid in downward direction.

Formaldehyde polymers suitable for use herein as the starting product subjected to decomposition may be polymers of low molecular weight, e.g. the products known as paraformaldehyde and α- or β-polyoxymethylene, or products formed as prepolymers in the preparation of high molecular weight polymers. Additionally, polymers of higher molecular weight, e.g. waste products obtained in the processing of formaldehyde polymers of high molecular weight may also be used. Generally, it is preferred to use paraformaldehyde as the starting material, same being commercially available with a formaldehyde content of about 88 to 98% by weight.

When an aqueous formaldehyde solution is used as the starting material, it is preferred to use a solution containing at least 60% by weight of formaldehyde. Such a solution can be obtained, if desired, by evaporation of a more dilute solution, e.g. a 30 to 40% solution, which is normally available as a commercial product.

While many substances of acid reaction may be used in the present process as mentioned above, the use of certain substances for this purpose is often to be preferred. Thus, for example, in a preferred way of carrying out the invention, polyphosphoric acid containing at least 60% and at most 90% by weight of phosphorous pentoxide is used as the substance showing an acid reaction, or as a constituent of a mixture of substances showing an acid reaction. By "polyphosphoric acid" is here to be understood one or more compounds of phosphorous pentoxide and water, or a mixture of such a compound with either water or phosphorous pentoxide. Consequently, the above definition also covers the compounds ortho-, pyro-, tetra-, and meta-phosphoric acid.

If polyphosphoric acid is used as the substance showing an acid reaction, the process according to the invention may be carried out with or without a liquid vehicle. The amount of the substance showing an acid reaction which may be utilized can be varied, but, generally speaking, a larger amount of the polyphosphoric acid is needed if no vehicle is used. Good results may, for instance, be obtained in the absence of a vehicle, if such an amount of polyphosphoric acid is added that, per mole of water contained in the starting product, ⅓ mole of phosphorous pentoxide is present, although smaller or larger amounts may also be used. However, in the presence of a vehicle, and particularly a vehicle which is capable of dissolving the polyphosphoric acid, it is sufficient in most cases to use an appreciably smaller amount. If dioxane is used as the vehicle and paraformaldehyde as the starting product, good results may for instance also be obtained if polyphosphoric acid is used in an amount of only 0.05 percent by weight relative to the amount of paraformaldehyde.

In another preferred way of carrying out the process, sulphurtrioxide hydrate, containing at least 70% and at most 95% by weight of sulphur trioxide, is used as the substance showing an acid reaction, or as a constituent of a mixture of substances showing an acid reaction. By "sulphurtrioxide hydrate" is here to be understood a compound, or a mixture of compounds of sulphurtrioxide and water, or a mixture of such a compound and either sulphurtrioxide or water. Consequently, the above definition also covers the compounds sulphuric acid and pyrosulphuric acid and the solutions of sulphurtrioxide in sulphuric acid, which are known as oleum.

When sulphurtrioxide hydrate is used as the substance showing an acid reaction or as a component of a mixture of substances showing an acid reaction, the process according to the invention will generally yield optimum results only if it is carried out in the presence of a vehicle which, at least at the decomposition temperature used, is capable of dissolving the sulphurtrioxide hydrate. Generally the amount of this substance showing an acid reaction may then be added in a small amount. For example, when dioxane is used as the vehicle and paraformaldehyde as initial product, good results are obtained when the sulphurtrioxide hydrate is used in an amount of no more than 0.05% by weight calculated on the amount of paraformaldehyde.

A third preferred way of carrying out the present invention comprises the use of dilute phosphoric acid, or dilute sulphuric acid, or a mixture of these dilute acids, as the substance showing an acid reaction or as components of mixtures showing an acid reaction. In this case, the content of water-free acids should correspond at most to 60% by weight of phosphorous pentoxide (i.e. 82.8%

H₃PO₄) or 70% by weight of sulphur trioxide (i.e. 85.8% H₂SO₄), and the substance should be dissolved in an inert vehicle. On the whole, the best results with these dilute acids are obtained only if use is made of the previously described process in which, at least in the first cooler, the components condensed from the vapor mixture are discharged in a downwards direction in the liquid state. Also in this case the amount of acid to be added may, normally, be small and in the application of, say, dioxane as vehicle, good results are obtained when the amount of dilute acid added contains no more anhydric acid than corresponds to 0.05% by weight of the amount of formaldehyde in the initial product. The strength of the dilute acid may be varied within very wide limits and may, for example, be considerably below the upper limits mentioned above. For example, a very good result can usually be obtained with acid having a concentration of 10–50%, while acids of still lower concentrations may also be used. In this use of a very dilute acid, the yield of very pure formaldehyde decreases somewhat, but this is not due to any increased prepolymer formation.

Compared with the application of polyphosphoric acid or sulphurtrioxide hydrate, the use of the above mentioned dilute acids in the process according to the invention offers certain advantages, such as a lower consumption of chemicals, a reduced aggressiveness of the reaction mixture towards the constructional material of the decomposition reactor and a greater freedom for varying the limits between which the acid strength must be kept during the process.

The process according to the invention may be carried out batchwise as well as in a partly or fully continuous way. The various components, that is to say the initial product to be decomposed, the substance showing an acid reaction and the vehicle, if any, may be supplied separately to the decomposition reactor, but it is also possible to prepare a mixture of these substances and feed this mixture to the reactor. Especially when a vehicle and only a slight amount of the substance showing an acid reaction are being used. The substance showing an acid reaction is preferably added in the form of a dispersion or a solution in the vehicle. It is recommended that an appropriate agitator be placed in the decomposition reactor to promote a uniform evolution of formaldehyde.

The process described herein can be carried out continuously in various ways. In the event no vehicle is used, an amount of product consisting substantially of the substance showing an acid reaction, water and other impurities may be continuously discharged from the decomposition reactor. This discharged mixture is then freed from water and other impurities by distillation, or in some other way. Thereafter, the resulting purified substance showing an acid reaction, together with fresh material added to it if necessary, is fed back into the decomposition reactor.

A similar process may be employed in cases where a high-boiling vehicle is used. Also when a low-boiling vehicle is present and the process is carried out in such a way that the liquid condensed in the cooler is directly fed back into the decomposition reactor, continuous withdrawal of an amount of product from the decomposition reactor and purification of this product is necessary. When a low-boiling vehicle is used, the removal of water and other impurities, however, may also be carried out by subjecting the liquid condensed in the cooler to a purification treatment prior to feeding it back into the decomposition reactor. It may be advantageous then to use a vehicle made up of at least two components in such a way that in the condensed liquid a segregation takes place between a water-poor and a water-rich layer.

The temperature at which the decomposition is carried out will vary and depends on the character of the initial products to be decomposed and of the vehicle, if any. In the decomposition of solid formaldehyde polymers effected in the absence of a vehicle, the use of a rather high decomposition, temperature, e.g. 130–180° C., is preferred.

When a high-boiling vehicle is present, there is normally used a decomposition temperature at which the decomposition pressure of the formaldehyde polymer has already reached an appreciable value, for example 100–150° C. When low-boiling vehicles are present, or during decomposition of aqueous formaldehyde solutions, the decomposition temperature will normally not exceed the boiling point of the vehicle, or of an azeotrope with water if present, and will be somewhere between, for example, 70° and 100° C.

The decomposition is usually effected under atmospheric pressure, but it may also be carried out under a slight overpressure of, for example, ¼, ½ or 1 atmosphere. It is also possible to work under reduced pressure. During the decomposition a small stream of an inert gas, for example, dry nitrogen or argon may be passed through the apparatus, and it is also recommended that the whole apparatus be flushed with such a gas before the start of the decomposition process.

It will be appreciated from the foregoing that the amount of substance showing acid reaction utilized in the present process may be varied widely and depends upon the formaldehyde-containing starting material, the nature of the substance itself and other operating factors. Generally speaking, however, effective results are obtained by using 0.01 to 50% by weight of the substance based on the weight of formaldehyde in the starting material, but the optimum amount in any particular situation must be specifically determined.

The formaldehyde prepared by the process according to the invention, whether gaseous or liquid, does not show a tendency by itself to form low molecular weight polymerization products and may be kept as such in dry vessels for a long time. It can be polymerized into high molecular weight formaldehyde polymers with good plastic properties in a known manner and with the aid of known initiators.

The invention is illustrated, but not limited, by the following examples:

EXAMPLE 1

Very pure formaldehyde was prepared by thermal decomposition of paraformaldehyde in the presence of various vehicles and substances showing an acid reaction. The effect of the formaldehyde content of the initial product, and the character and quantity of the vehicle and the substance showing an acid reaction was shown by means of experiments in which the formaldehyde, subsequent to its formation, was converted to high molecular weight polymers. The activity was measured with reference to the yield of high molecular weight polymer relative to the amount of formaldehyde present in the initial product and to the amount of prepolymer deposited in two vessels, cooled at −12 to −15° C., through which the formaldehyde gas was passed prior to being fed into the polymerization reactor. The decomposition reactor, consisting of a glass flask of 1000 ml. capacity and being provided with an agitator, was connected with the cooling vessels via a reflux cooler, liquid condensed in this cooler flowing directly back into the decomposition reactor. The polymerization to high molecular weight polymer took place in heptane containing a small amount of a polymerization initiator.

For a compilation of the test results, reference may be had to Table 1, wherein the various vertical columns represent, respectively, from left to right:

(1) The amount of paraformaldehyde, in grams;
(2) The formaldehyde content of the paraformaldehyde;
(3) The character of the substance showing an acid reaction;
(4) The amount of the substance showing an acid reaction;

(5) The character of the vehicle used;
(6) The amount of the vehicle used;
(7) The decomposition temperature;
(8) The temperature of the cooling liquid in the reflux cooler;
(9) The duration of the decomposition process;
(10) The yield of high molecular weight polymer;
(11) The amount of prepolymer formed.

EXAMPLE 2

Using the procedure described in Example 1, a number of experiments were performed, the initial product being aqueous formaldehyde solutions of various concentrations, viz. a commercial product containing 36.5% by weight of formaldehyde, and two solutions of higher concentration obtained from the former by evaporation.

For a compilation of the test results reference may be

*Table 1*

| Paraformaldehyde | | Substance showing acid reaction | | Vehicle | | Decomposition temp., °C. | Temp. cooler °C. | Decomposition period, min. | Polymer yield, percent by weight | Amount of prepolymer |
|---|---|---|---|---|---|---|---|---|---|---|
| Grams | Percent by weight | Character | Grams | Character | Ml. | | | | | |
| 75 | 95 | Polyphosphoric (80% $P_2O_5$) | 10 | Heptane | 500 | 90–95 | 12 | 240 | 84.2 | Slight. |
| 75 | 95 | ...do... | 10 | Kerosene | 500 | 120–140 | 12 | 100 | 56.1 | Small. |
| 75 | 95 | ...do... | 10 | Dioxane | 500 | 95–100 | 12 | 180 | 92.6 | Very slight. |
| 75 | 95 | ...do... | 5 | ...do... | 500 | 95–100 | 12 | 180 | 99.7 | None. |
| 75 | 95 | ...do... | 2.5 | ...do... | 500 | 91–98 | 12 | 165 | 98.9 | Do. |
| 75 | 95 | $SO_3$-hydrate (78.5% $SO_3$) | 5.5 | Dioxane | 500 | 94–98 | 12 | 115 | 91.2 | Slight. |
| 75 | 95 | $SO_3$-hydrate (83.3% $SO_3$) | 2.5 | ...do... | 500 | 94–98 | −12 | 120 | 95.4 | Very slight. |
| 60 | 95 | Dilute phosphoric acid (50% $H_3PO_4$). | 3 | Dioxane | 500 | 94–96 | −15 | 75 | 96.5 | Very slight. |
| 60 | 95 | ...do... | 1 | ...do... | 500 | 93–95 | −15 | 75 | 96.5 | Do. |
| 60 | 95 | ...do... | 0.5 | ...do... | 500 | 92–96 | 12 | 105 | 89.5 | Slight. |
| 60 | 95 | ...do... | 3 | Diethyl-(diethylene glycol) ether. | 400 | 117–129 | 12 | 28 | 82.5 | Do. |
| 60 | 97 | ...do... | 3 | Dioxane / Kerosene | 240 / 225 | 94 | −15 | 75 | 94.5 | Very slight. |
| 60 | 97 | ...do... | 2 | Dioxane / Dekalene | 250 / 240 | 95 | −15 | 80 | 94.5 | Do. |
| 60 | 95 | Dilute phosphoric acid (4% $H_3PO_4$). | 39 | Dioxane | 500 | 88 | 12 | 165 | 82.5 | Slight. |
| 60 | 95 | Dilute sulphuric acid (50% $H_2SO_4$). | 3 | Dioxane | 500 | 92–96 | 12 | 105 | 93.9 | Very slight. |
| 80 | 89 | ...do... | 0.7 | ...do... | 500 | 90–96 | 12 | 105 | 91.3 | Do. |
| 80 | 89 | Dilute phosphoric acid (50% $H_3PO_4$). / Dilute sulphuric acid (50% $H_2SO_4$). | 0.7 / 0.7 | Dioxane | 500 | 92–96 | 12 | 105 | 88.5 | Very Slight. |
| 75 | 95 | Oxalic acid | 10 | Dioxane | 500 | 90–95 | 12 | 120 | 84.2 | Slight. |
| 75 | 95 | Trichloro acetic acid | 16 | ...do... | 500 | 90–95 | 12 | 120 | 92.6 | Very slight. |
| 75 | 95 | P. toluene sulphonic acid | 10 | ...do... | 500 | 90–95 | 12 | 120 | 99.7 | None. |
| 75 | 95 | Zinc chloride | 14 | ...do... | 500 | 90–95 | 12 | 120 | 95.5 | Very slight. |
| 60 | 95 | | | Dioxane | 500 | 90–95 | 12 | 20 | | Very large. |

These results clearly demonstrate the action of the substances showing an acid reaction, even in those cases where only small amounts of the said substances were used. It will be noted, however, that when the substance showing an acid reaction is absent, as in the last experiment mentioned in the table, substantially all of the formaldehyde formed was converted to prepolymer, with the result that after a short time the test had to be stopped due to blockage of the lines.

had to Table 2, wherein the various vertical columns represent, reading from left to right:

(1) The amount of formaldehyde solution, in grams;
(2) The formaldehyde content of the solution;
(3–11) The same items as mentioned in the corresponding columns of Table 1.

*Table 2*

| Formaldehyde solution | | Substance showing acid reaction | | Vehicle | | Decomposition temp., °C. | Temp. cooler, °C. | Decomposition period, min. | Polymer yield percent by weight | Amount of prepolymer |
|---|---|---|---|---|---|---|---|---|---|---|
| Grams | Percent by weight | Character | Grams | Character | Ml. | | | | | |
| 100 | 36.5 | Dilute phosphoric acid (50% $H_3PO_4$). | 6.7 | Dioxane / Kerosene | 250 / 250 | 87–89 | −15 | 125 | | Large. |
| 215 | 53.8 | ...do... | 10 | Dioxane | 430 | 88.5–89.5 | −15 | 40 | | Do. |
| 220 | 53.8 | ...do... | 3 | ...do... | 250 | 88–90 | −15 | 30 | | Do. |
| 100 | 75.7 | ...do... | 10 | ...do... | 200 | 87–91 | −15 | 105 | 47.6 | Slight. |
| 100 | 75.7 | ...do... | 10 | Dioxane / Kerosene | 200 / 200 | 88–92 | −15 | 90 | 41.0 | Do. |
| 100 | 75.7 | Polyphosphoric acid (80% $P_2O_5$). | 10 | Dioxane / Kerosene | 200 / 200 | 90–92 | −15 | 105 | 70.0 | Very slight. |

These results clearly show that very pure formaldehyde, which by itself does not tend to form low molecular weight polymerization products, can also be prepared from concentrated formaldehyde solutions by means of the present process. These discontinuous or batch experiments gave a lower yield of pure formaldehyde than the experiments carried out with paraformaldehyde as initial product, but this is due to the fact that, in the batch operations, an amount of formaldehyde is left behind in the decomposition reactor in the dissolved state. When the process is carried out continuously, very pure formaldehyde can also be obtained in high yields from aqueous formaldehyde solutions.

It will be appreciated that various modifications may be made in the invention described herein without deviating from the scope thereof as set forth in the attached claims wherein we claim:

1. In a process for the preparation of formaldehyde by the thermal decomposition of a mixture consisting essentially of water and a component selected from the group consisting of formaldehyde, paraformaldehyde, α-polyoxymethylene and β-polyoxymethylene, wherein a mixture of vapors is given off as a result of said thermal decomposition, the improvement which comprises
   (1) carrying out said thermal decomposition in the presence of
      (a) a substance which, under the reaction conditions of a pH of less than 7 and a degree of volatility not exceeding 1% of its weight per hour without respect to water present as diluent and shows an acid reaction and
      (b) a liquid vehicle which is inert under the reaction conditions and has a high boiling point such that the partial vapor pressure thereof is low at the reaction conditions, said boiling point being such that more than half of the issuing vapor mixture consists of liquid vehicle, said liquid vehicle being capable of dissolving the substance showing acid reaction and being solvent for water both at the reaction conditions and at a cooling temperature above the boiling point of formaldehyde.
   (2) passing the mixture of vapors formed during said thermal decomposition into a cooling zone maintained at a temperature above the boiling point of formaldehyde to form a condensate containing the evaporated vehicle and water,
   (3) discharging the resulting condensate from said zone, and
   (4) recovering as the remaining part of said mixture of vapors a highly pure formaldehyde which does not tend to form undesirable low molecular weight polymerization products.

2. The process of claim 1 wherein said vehicle comprises an ether.
3. The process of claim 2 wherein said vehicle is dioxane.
4. The process of claim 1 wherein the substance showing and acid reaction comprises polyphosphoric acid containing from 60 to 95% by weight of phosphorous pentoxide.
5. The process of claim 1 wherein the substance showing and acid reaction comprises sulphurtrioxide hydrate containing at least 70 and at most 95% by weight of sulphur trioxide.
6. The process of claim 1 wherein the substance showing and acid reaction comprises dilute phosphoric acid containing an amount of water-free phosphoric acid equivalent to at most 60% by weight of phosphorous pentoxide.
7. The process of claim 1 wherein the substance showing and acid reaction comprises dilute sulphuric acid containing an amount of water-free sulphuric acid equivalent to at most 70% by weight of sulphur trioxide.
8. The process of claim 1 wherein said substance comprises at least one inorganic acid selected from the group consisting of phosphoric acids derived from phosphorous pentoxide, orthophosphoric acid, sulphur trioxide hydrates, sulphuric acid, arsenic acid, boric acid, molybdic acid, selenic acid, uranic acid, wolframic acid and chlorosulphonic acid.
9. The process of claim 1 wherein said substance comprises at least one organic acid selected from the group consisting of oxalic acid, succinic acid, sebacic acid, palmitic acid, stearic acid, trichloro-acetic acid, para-toluene sulphonic acid, terephthalic acid, phthalic anhydride and cyclohexane carbonic acid.
10. The process of claim 1 wherein said substance comprises at least one compound selected from the group consisting of the aluminum, boron, chromium, silicon and vanadium oxides, ferric chloride, zinc chloride, monosodium phosphate and acid potassium phosphate.

References Cited by the Examiner

UNITED STATES PATENTS

| | | | |
|---|---|---|---|
| 2,125,375 | 8/38 | Hinegardner | 260—606 X |
| 2,304,431 | 12/42 | Walker. | |
| 2,460,592 | 2/49 | Miller | 260—606 |
| 3,000,960 | 9/61 | Wheeler et al. | 260—606 |

JOSEPH R. LIBERMAN, *Primary Examiner.*

CHARLES B. PARKER, LEON ZITVER, *Examiners.*